Sept. 23, 1952          H. JENSEN          2,611,802
METHOD AND APPARATUS FOR MAGNETIC EXPLORATION
Filed July 2, 1946          3 Sheets-Sheet 1
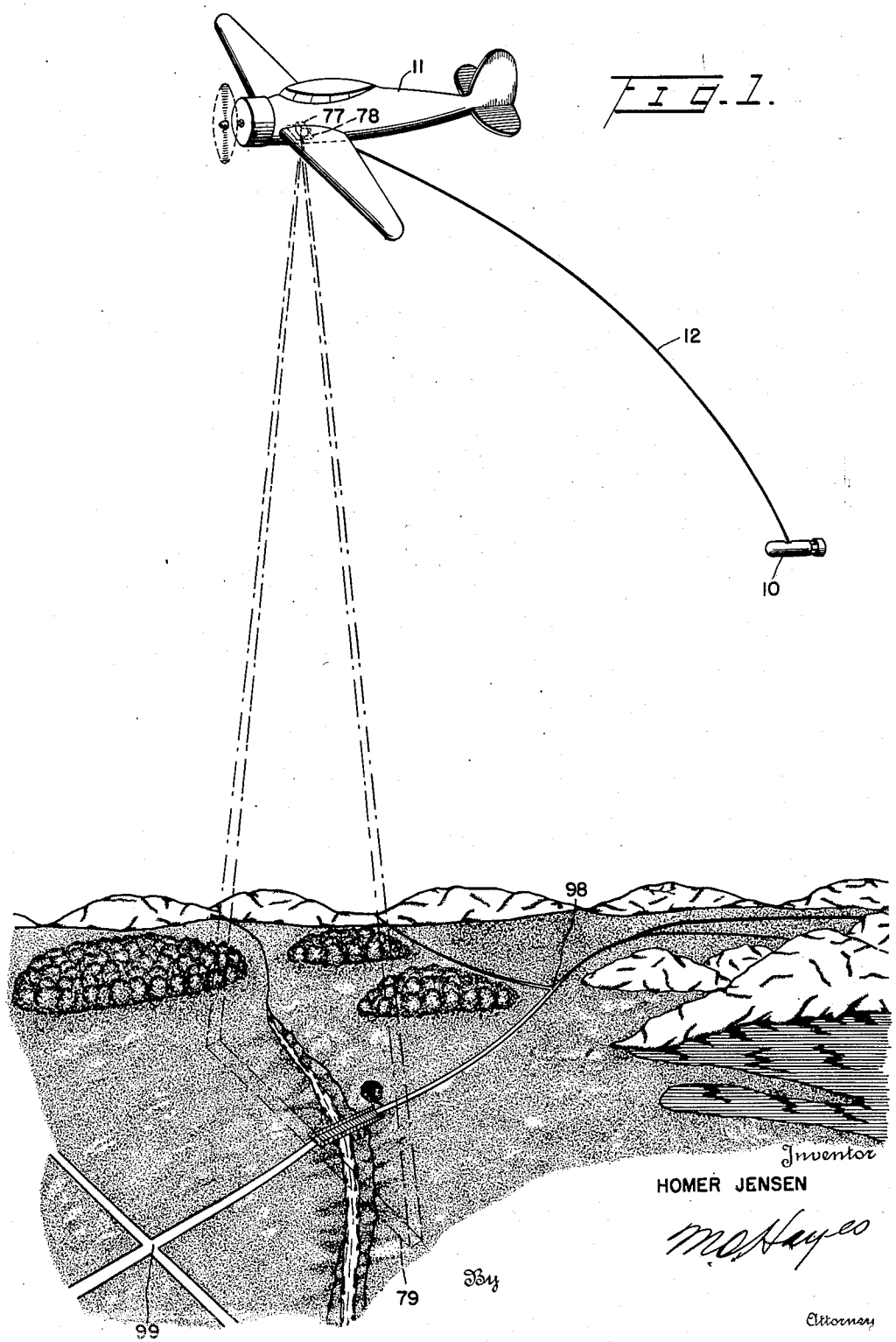
Inventor
HOMER JENSEN
Attorney

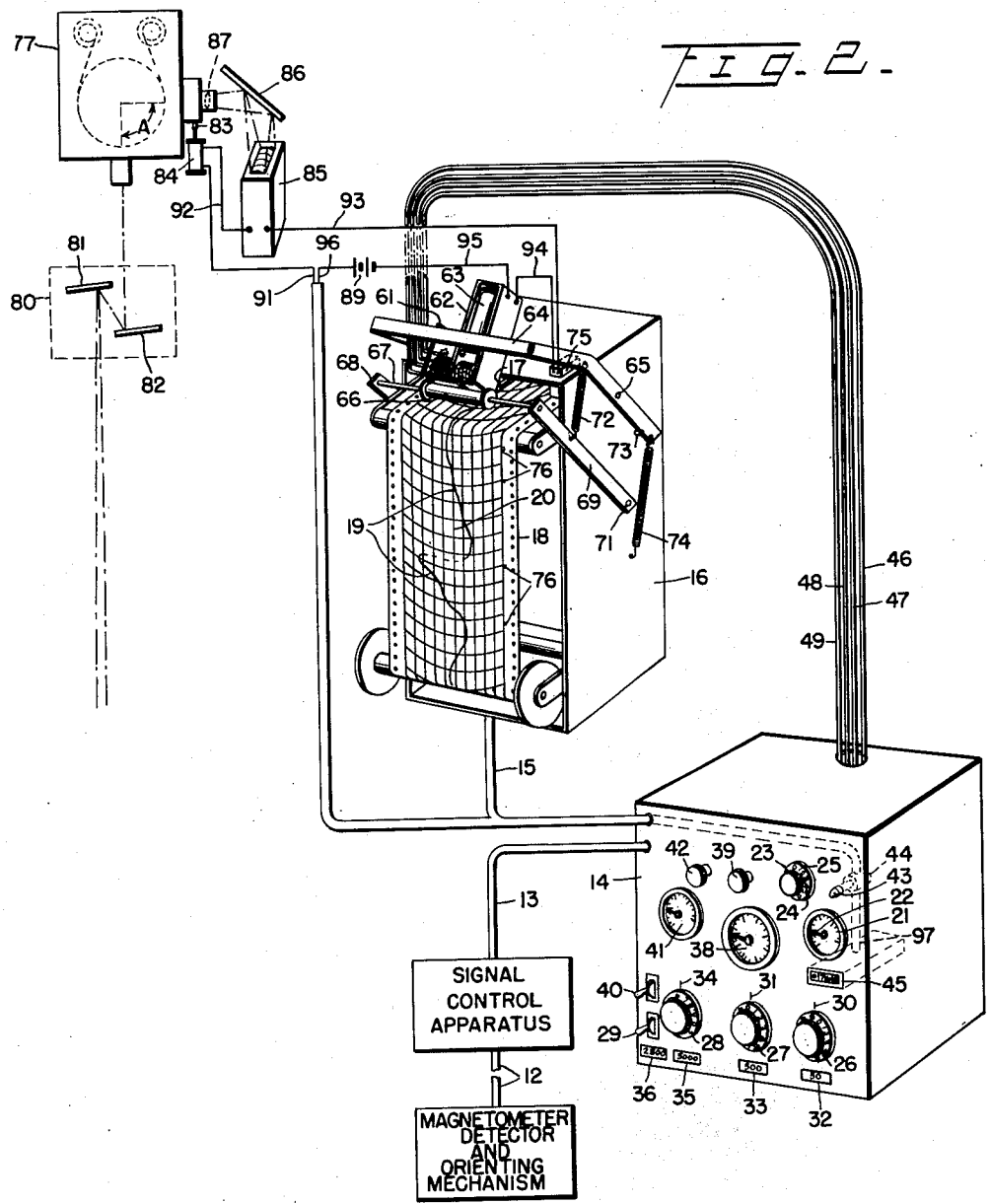

Sept. 23, 1952  H. JENSEN  2,611,802
METHOD AND APPARATUS FOR MAGNETIC EXPLORATION
Filed July 2, 1946  3 Sheets-Sheet 3
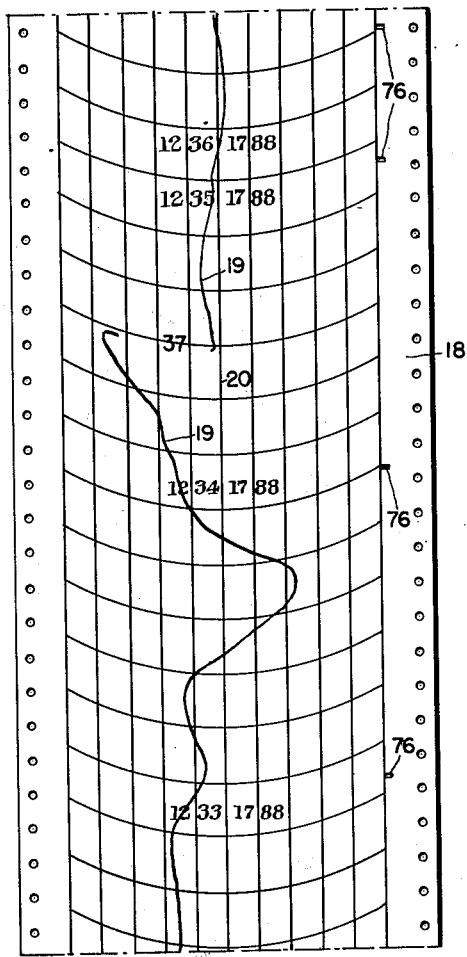
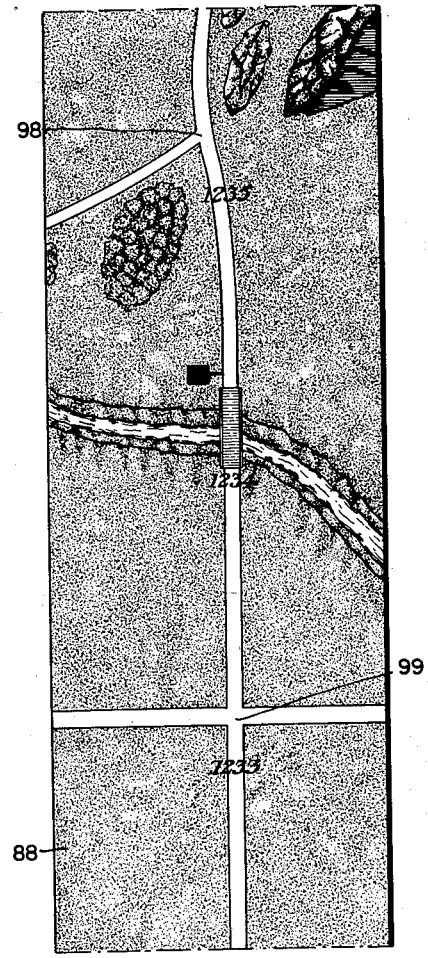
Inventor
HOMER JENSEN
By M. C. Hayes
Attorney Patented Sept. 23, 1952

2,611,802

UNITED STATES PATENT OFFICE 2,611,802

METHOD AND APPARATUS FOR MAGNETIC EXPLORATION

Homer Jensen, Philadelphia, Pa.

Application July 2, 1946, Serial No. 680,906

6 Claims. (Cl. 175—182)

(Granted under the act of March 3, 1883, as amended April 30, 1928; 370 O. G. 757)

This invention relates generally to methods and apparatus for conducting magnetic explorations from an aircraft in flight and more particularly to improvements in the method and apparatus disclosed in the copending application of Lynn H. Rumbaugh et al. for Method and Apparatus for Conducting Geophysical Surveys, Serial No. 682,518, filed July 10, 1946.

In the aforesaid application a standard Navy Magnetic Airborne Detector, identified as AN/ASQ—3A and referred to hereinafter as MAD, is adapted to provide a continuous record trace corresponding to space changes in the total value of the earth's magnetic field as the aircraft support therefor moves along a predetermined traverse, the MAD including a control box having dials for adjusting and indicating the sensitivity of the MAD and the value of the center or base line of the recording chart upon which the record trace appears. Photographic apparatus is employed with the MAD and is adapted to permanently fix and record ground positions corresponding respectively to certain points on the record trace.

A radio altimeter and an electric number counter are associated with the control box, and a conventional electrical edge-marking device, adapted to be operated in synchronism with the number counter as each photograph of the terrain is taken by the aforementioned photographic apparatus, is operatively associated with the recorder to edge-mark the chart thereof.

The photographic apparatus includes a camera adapted to photograph selected check points on the ground disposed along the traverse and an optical system adapted to split the field of view of the camera and superimpose on the film adjacent the image of the terrain thereon, images of the control dials, altimeter dial and a serial number appearing on the counter, thereby to indicate on the photographic record at the time each picture of the terrain is taken, the degree of sensitivity of the MAD, the magnetic value of the center line of the recording chart, the height of the aircraft above the ground, and a serial number having a corresponding edge-mark on the record chart.

In the use of this apparatus, the aircraft is caused to move along a systematic series of adjoining and transverse traverses at each of several different altitudes. The record trace is produced continuously during the course of each traverse and, at selected points therealong, composite photographic records of the terrain and control box readings are produced simultaneously, these records being correlated with the record trace by the edge-marks on the recorder chart. Thereafter, by plotting the relationship between the variations in the magnetic field strength and the ground positions corresponding thereto, it is possible to draw isomagnetic contours from which logical inferences and accurate quantitative deductions as to the nature of the substrata can be established.

In the process of plotting the relationship between the variations in the field strength and the ground positions corresponding thereto, the true distances between the edge-marks on the record tape are determined by examining the composite photographic record and locating the numbered terrain photographs on master photographs or aerial maps which serve as flight guides in making the traverses over a given area, identifiable landmarks which define known distances therebetween on the aerial maps serving to establish unit distances thereon and, hence, the true distances between the numbered photographs and the edge-marks corresponding thereto. After all possible terrain photographs have been identified and located as points on the master photographs, the composite photographic record is re-examined and the instrument data appearing thereon is transferred to the record tape. Thereafter, the curve on the record tape, which curve conains values in terms of curvilinear coordinates with discontinuities therein at changes in control box settings, is translated into a curve wherein the values are given in terms of rectangular coordinates, and wherein the distance variations and discontinuities on the record tape are corrected.

The arrangement of the foregoing apparatus has not been found to be entirely satisfactory in all conditions of use thereof for the reasons that the control box must be so arranged with respect to the camera as to be within the split field of view thereof, and use of the camera in providing photographs of the terrain at spaced intervals along the traverse introduces the possibility of obtaining an incomplete record of the terrain through too wide spacing of the picture-taking intervals. Moreover, the steps in locating the terrain photographs on the aerial maps and transferring the control box data appearing on each of the pictures to the record tape in the final analysis and correlation of the record trace with the photographic record involve time-consuming and tedious operations.

According to the arrangement of the present invention, the aforestated disadvantages are obviated by the provision of apparatus including a camera of the continuous-strip type for providing a continuous photographic record of the terrain disposed along the traverse and a stabilizing optical system associated therewith for maintaining a vertical line of sight between the camera and the terrain, thereby to avoid distortions of the image due to yawing, pitching and rolling of the aircraft in flight. Apparatus operatively associated with the control box and with the recorder providing the record trace also is provided for causing the control box data to be printed at will on the record tape.

The correlation between the photographic record and the record trace, thus provided, is accomplished by means of an electric edge-marking device associated with the recorder and an auxiliary lens and shutter on the camera, which lens and shutter combination is adapted to be operated in synchronism with the edge-marking device to superimpose upon the image of the terrain a serial number appearing upon an electric number counter which, for this purpose, is disposed in proper spaced relation to the camera. A solenoid for operating the shutter, the edge-marking device, the number counter, and second and third electric counters are connected in series in an electrical control circuit therefor, whereby these parts may be operated in synhronism under control of a button located on the control box.

The second counter is associated with the printing apparatus whereby a number corresponding to that appearing on the photographic record is caused to appear on the record tape as the control box data is applied thereto, and the third counter is arranged such that the serial number indicated thereby appears on the control box, thus providing a visual check on the proper operation of the other number counters.

Thus, by reason of this arrangement the camera and its associated number counter may be located in the aircraft in the position best suitable for photography of the terrain, and, similarly, the control box and its associated apparatus may be located in the position best adapted to facilitate operation of the controls thereof. Moreover, by this arrangement, all significant magnetic data is adapted to be printed directly on the record tape, and the correlation between the continuous record trace and the continuous photographic record may be provided at will at spaced intervals along each traverse by operation of the aforesaid control circuit which produces simultaneous actuations of the auxiliary shutter, the electric counters and the edge-marking device of the recorder. Furthermore, use of the continuous-strip camera together with the image stabilizing apparatus employed therewith provides the best possible picture of the terrain beneath the plumb point of the aircraft.

According to the method of conducting geophysical surveys in the use of the apparatus of the present invention, therefore, continuous records of space changes in the absolute or static value of the earth's magnetic field and of the terrain are produced simultaneously as the aircraft moves along a predetermined traverse, and at selected intervals therealong the aforementioned control circuit is actuated to cause an identifying number to appear on the film of the continuous-strip camera and simultaneously therewith to produce an edge-mark on the record tape. Still at other intervals along the traverse, particularly after the control box dials have been adjusted to change the base settings and/or sensitivity of the MAD, the printing apparatus is operated to make a printed record on the record tape of the control box data and of an identifying number corresponding to that appearing on the number counter associated with the camera. Thereafter, in plotting the relationship between the variations in the magnetic field strength and the ground positions corresponding thereto, it merely is necessary to determine the true distances between the edge-marks on the record tape by first determining the corresponding distances between the identifying numbers on the record film, and thereafter in terms of known distances appearing thereon to convert the curvilinear coordinates to rectangular coordinates and correct for distance variations and discontinuities of the record trace, the discontinuities therein being due to changes in settings of the control box dials.

An object of the present invention is to provide a new and improved method and apparatus for conducting geophysical surveys from an aircraft in flight.

Another object is to provide new and improved apparatus operable from an aircraft in flight for measuring and recording space changes in the total value of the earth's magnetic field and for permanently fixing and recording ground positions corresponding thereto.

Another object is to provide a new and improved method and apparatus for correlating the continuous record trace obtained from an airborne magnetometer with ground positions corresponding thereto by producing simultaneously therewith a continuous photographic record of the ground positions disposed along a predetermined line of flight, producing simultaneously at selected intervals along the flight edge-marks on the recording chart and serial numbers respectively corresponding thereto on the record film, and at other selected intervals causing identifying numbers corresponding to those appearing on the record film and control box data relating to the sensitivity of the magnetometer and the magnetic value of the base line of the recording chart to be printed thereon.

A further object is to provide a continuous-strip camera adaptable for use in photographing the terrain from an aircraft in flight at altitudes suitable for geophysical surveying and including an auxiliary lens system for producing a composite photographic record of the terrain and identifying serial numbers for correlating the ground positions appearing on the film with a continuous record trace obtained from magnetometer apparatus carried in the aircraft.

Still other objects, features and advantages of the present invention are those implied from or inherent in the novel combination and arrangement of parts wherein the aforedescribed method of the invention is practiced, the foregoing being accomplished by the specific apparatus and in the specific manner hereinafter more fully to appear, reference being had to the accompanying drawings wherein:

Fig. 1 is a diagrammatic view of an aircraft and an aerodynamic body towed thereby and suitable for use with the apparatus of the present invention for conducting magnetic surveys according to the method thereof;

Fig. 2 is a diagrammatic view of the complete apparatus according to the preferred embodiment of the invention, this apparatus being supported in part in the aircraft and in part in the aerodynamic body of Fig. 1;

Fig. 3 is a schematic view illustrating the operative connections between the control box dials and the number wheels comprising the printing apparatus;

Fig. 4 is a plan view of a portion of a record chart or tape illustrating the form of record trace obtained in the use of the apparatus of the present invention; and Fig. 5 is a plan view of a portion of the photographic record obtained in the use of the apparatus and illustrating the manner in which the identifying numerals appear thereon.

Referring now to the drawings for a more complete understanding of the invention, the MAD equipment shown diagrammatically in Fig. 2 comprises a magnetometer detector and an orienting mechanism therefor, which components are contained within the aerodynamic body 10, Fig. 1. The body or bird 10 is of non-magnetic construction and is towed from the aircraft 11 at a distance therefrom by a cable 12 so as to avoid the effects of the magnetic field of the aircraft. The aircraft 11, accordingly, may be of any suitable type which provides the desired speed and capacity regardless of the amount of steel which it may contain, the installation of the MAD and the photographic apparatus employed therewith being largely a matter of establishing connections between the components of the apparatus and adapting and mounting the same within the aircraft. The bird, however, must be constructed so as to be aerodynamically stable in flight, a suitable bird, for example, being similar to that disclosed and claimed in the copending application of Gerhard O. Haglund for Aerodynamic Body, Serial No. 671,341, filed May 21, 1946.

Towing cable 12 is a strain-cored multiconductor cable and serves to electrically interconnect the magnetometer detector and orienting mechanism with the signal control apparatus therefor carried within the aircraft 11, whereby a detecting element in the bird is adapted to be maintained in alignment with the direction of the earth's magnetic field under control of the signal control apparatus.

The signal control apparatus also operates to produce electrical signals which correspond to space changes in the total value of the earth's magnetic field sensed by the aforesaid detector element, and these signals are applied by way of a cable conductor 13, control box 14, and cable conductor 15 to a recording milliammeter 16 to drive the pin 17 thereof with respect to its coacting chart 18 whereby a record trace 19 is produced on the chart. Recorder 16 preferably is of the E-A type of spring-driven recorder well known in the art.

The electrical signals produced by the signal control apparatus also operate a galvanometer 21 whereby the pointer 22 thereof indicates in relation to the scale associated therewith, the corresponding movements of the recording pen 17.

The control box 14 also includes a sensitivity adjusting dial 23 by means of which the full scale deflection of the recorder pen 17 from edge to edge of the chart may be controlled, the dial being provided, for example, with sensitivities of 50, 100, 200, 500, 1000 and 5000 gammas, and the pointer 24 being movable into positions opposite the numbers 1 to 6 provided on the dial plate 25 and corresponding to the aforesaid sensitivities.

The control box further includes a plurality of dials 26, 27 and 28 and a control switch 29 which control means for nulling out predetermined portions of the total field at the detector element and thus determine the magnetic value of the center or base line 20 of the recording chart.

Dials 26 and 27 each have nine positions indicated thereon which are adapted to be moved into alignment with the reference lines 30 and 31 respectively, 50 gammas being provided between positions on dial 26, as indicated at 32, and 500 gammas being provided between positions on dial 27, as indicated at 33. Dial 28 has 10 positions indicated thereon which are adapted to be moved into alignment with the reference line 34, 5000 gammas being provided between these positions, as indicated at 35. Control switch 29 is employed to add 2500 gammas, as indicated at 36, to the nulled out portion of the field, this being useful under certain conditions of adjustment of dials 26 and 27.

Thus, in a total field at the detector element of approximately 56,750 gammas, the nulling means may be arranged to null out permanently 30,000 gammas in the field, dial 28 may be set in position 5 thereof to null out 25,000 gammas, dial 27 set in position 3 thereof to null out 1,500 gammas, and dial 26 set in position 5 thereof to null out 250 gammas whereby the recorder pen 17 is caused to assume a position on the base line 20 of chart 18. Thereafter, upon variation in the field at the detector element, the pen is caused to move to the right or to the left according to increases or decreases in the value of the field from said base value of 56,750 gammas. Occasionally, it becomes necessary to adjust the control box dials 23 and 26 through 28, and rarely control switch 29, to keep the pen on scale on the chart, and at such times a break indicated at 37 on the chart, Fig. 4, occurs in the trace 19.

A suitable milliammeter 38 is employed to indicate a constant value of direct current supplied for nulling purposes, variable portions of the current being supplied to the pickup coil of the aforesaid detecting element according to the adjustments of dials 26 through 28 and control switch 29. It is essential that the D. C. source of nulling current be maintained at a constant value in order that adjustments of the dials produce field changes corresponding accurately to the gamma increments indicated thereby. For this purpose knobs 39 and 42 are provided, the knobs controlling means for adjusting the current value.

A voltmeter 41 also is employed to indicate the value of the voltage supplied to the MAD, this voltage being derived from the power source of the aircraft. The switch 40 is employed for controlling certain circuits during the routine test of the apparatus.

A control button 43, adapted to close a switch 44, is employed to actuate a register counter 45 having the numbers thereon arranged flush with the front panel of the control box, and simultaneously therewith to actuate other apparatus employed in the control circuit thereof, as will appear more fully hereinafter.

The aforedescribed MAD equipment and the operation thereof are described in considerable detail in the operating and maintenance instructions therefor furnished to the Navy and identified as AN—08—10—252 and CO—AN—08—20—14 respectively, and reference may be had thereto for further details of construction and operation. These reports are available in photostat or microfilm form at the Office of Technical Services, Department of Commerce, the report numbers designating these reports being PB—27559 and PB—27560 respectively.

Dials 23 and 26 through 28 are operatively connected, as by flexible cables 46 through 49 respectively, to conventional printing wheels 51 through 54 having rubber numerals thereon corresponding to the positions of the dials individual thereto. The driving connections between each of the cables and the printing wheel on one end thereof and between the cable and the control dial on the other end thereof may be arranged in any convenient manner such, for example, as by the gear drives interposed therebetween. Thus, a pinon 55 at one end of each of the cables drives a gear 56 secured to the printing wheel individual to the cable, and a pinion 57 at the other end of each of the cables is driven by a gear 58 secured to the operating shaft of the control dial individual to the cable, the gear ratios at both ends of each of the cables being the same whereby the printing wheels are displaced angularly by the same amount as the dials individual thereto.

Wheels 51 through 54 are supported for rotation about a common axis 59 between a pair of spaced plates 61 and 62, plate 62 being U-shaped so as to serve additionally as a bracket support for a conventional electric register counter 63 which is provided with rubber letters on the wheels thereof.

Plates 61 and 62 are secured to a U-shaped swing frame 64 which is secured, as at 65 on both ends thereof, to the casing of recorder 16 for swinging movement thereon whereby the printing wheels 51 through 54 of the register counter may be moved into contact with the recording chart 18 to leave thereon an imprint of the numerals appearing on the wheels. To this end, the wheels are caused to pass over an ink roller 66 which is rotatably supported on a rod 67, in turn secured at the ends thereof to arms 68 and 69 which are pivotally secured to the sides of the recorder casing as at 71.

Rod 67 and arms 68 and 69 together comprise a swing frame which is yieldably urged toward swing frame 64 as by a coil spring 72 interconnected therebetween, frame 64 being normally yieldably urged into engagement with a stop pin 73 as by a coil spring 74 interconnected between the extreme end of frame 64 and the recorder casing.

Thus, as frame 64 is moved toward the recording chart 18, the printing wheels carried thereby first pass over the roller 66 to apply ink to the numerals thereon before engaging the chart, the swing frames thereafter returning to their positions as seen in Fig. 2 under power of springs 72 and 74.

A conventional electrical edge-marking device 75, usually provided for use with recorders of the aforesaid type, is cooperatively employed with recorder 16 and is adapted upon each operation thereof to produce an edge-mark 76 on the recorder chart 18.

A camera generally designated 77 is suitably mounted within the aircraft for vertical photography of the terrain through a suitable port 78. Camera 77 is preferably of the continuous-strip type such, for example, as the Sonne S—8 manufactured by the Chicago Aerial Survey Company, whereby a continuous photographic record of the terrain may be produced thereby, such a camera being characterized by having a very narrow slit or optical opening resulting in an angle of acceptance which is extremely narrow, as indicated generally at 79 in Fig. 1.

The continuous-strip camera is not satisfactory for use at required altitudes unless provision is made for stabilizing the images of the terrain recorded on the film thereof, distortion of the images otherwise resulting from yawing, pitching and rolling of the aircraft in flight. A suitable image stabilizing device is indicated generally at 80 and is disclosed in detail in my copending application for Image Stabilizing Apparatus and Method, Serial No. 662,164, filed April 15, 1946. Suffice it to state herein that the stabilizing device 80 comprises a pair of reflecting elements 81 and 82 which are adapted to be gyroscopically controlled so as to cause various portions of the light path from the terrain to the camera lens to have minimum angles of deviation from each other whereby rotation of the images on the film and resultant distortion thereof, is reduced to a minimum.

Camera 77 is provided with a shutter 83 which is adapted to be actuated by a solenoid 84 thereby to superimpose on the image of the terrain on the film of the camera, an image of a serial number appearing on a conventional register counter 85, a reflecting element 86 being employed to conveniently bring the serial number into the field of view of a lens 87. The numbers on counter 85 preferably are arranged backwards on the wheels thereof so as to appear frontwards on the composite photographic record 88, Fig. 5, the numerals appearing centrally thereon, but being spaced from the ground positions respectively corresponding thereto by the constant peripheral or film distance corresponding to the angle A between the main and auxiliary camera lenses.

Solenoid 84, counters 85, 63 and 45, and edge-marking device 75 are arranged in a simple series circuit including a battery 89 and the aforementioned switch 44 in the control box whereby these parts are simultaneously energized upon depression of button 43 on the control box. This circuit may be traced from switch 44, conductor 91, solenoid 84, conductor 92, counter 85, conductor 93, edge-marking device 75, conductor 94, counter 63, conductor 95, battery 89, conductor 96, counter 45, and thence by way of conductor 97 to the other side of switch 44.

Counters 45, 63 and 85 may be of any suitable type such, for example, as Western Electric register counters, type 12F.

In the use of the aforedescribed apparatus in conducting geophysical surveys, the aircraft 11 and its associated magnetometer apparatus are flown along predetermined survey lines or traverses. The record trace 19 and the photographic record 88 of the terrain are produced continuously during the course of the traverses, and control dials 23 and 26 through 28 are adjusted, as necessary, to keep the pen 17 on scale on the chart 18, or to provide the desired magnitude of the pen deflections, as the case may be.

From time to time, the operator depresses button 43 on the control box to edge-mark the record chart and simultaneously therewith to superimpose a number corresponding thereto on the photographic record, thereby to correlate the continuous photographic and trace records. At other times, particularly after the control box dials have been adjusted, swing frame 64 is actuated to stamp the numbers carried thereby on the record chart. The four numbers to the right in each group of the stamped numbers comprise the serial number corresponding to the serial numbers appearing on the photographic record 88 and appearing visually on number counter 45 on the control box. The first number at the left in each group of stamped numbers indicates the sensitivity of the MAD and the second, third and fourth numbers in each group of stamped numbers indicate the settings of dials 28, 27 and 26 respectively, and thus indicate the magnetic value of the center line of the chart.

Thus, edge-mark 76 at the bottom of the record chart 18, as seen in Fig. 4, corresponds to the serial number 1233 appearing on both the chart and the photographic record 88. After this edge-mark is made, however, upon further actuation of the swing frame, serial number 1234 is stamped on the chart until the next succeeding edge-mark is made, serial number 1235 being thereafter stamped on the chart, etc. Between the printing of serial numbers 1234 and 1235 on the chart, dial 26 had been changed thereby to cause the base numbers to be changed from 789 to 788.

After the traverses in a predetermined area have been completed and the film used therefor developed, the true distances between the edge-marks on the record trace are determined from the photographic record, the intersections 98 and 99 indicated thereon, for example, defining a known distance therebetween from which the true distances between the serial numbers, and hence their corresponding edge-marks, may be determined.

Thereafter, the record trace is translated into copy traces giving the true relation between the variations in the earth's magnetic field and the ground positions corresponding thereto, and from the copy traces isomagnetic contours are prepared, all in the manner specifically set forth in the aforesaid copending application of Lynn H. Rumbaugh et al.

From the foregoing, it should now be apparent that a method and apparatus for conducting geophysical surveys has been provided which is well adapted to fulfill the aforestated objects of the invention, and while the invention has been described in particularity with respect to a specific method and apparatus which gives satisfactory results, it will be understood that various changes may be made by those skilled in the art to which the invention most nearly appertains without departing from the spirit and scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. A method of geophysical surveying which comprises the steps of flying an aircraft and magnetometer apparatus associated therewith along a predetermined traverse, measuring the total magnetic field with said magnetometer so as to produce a continuous record trace corresponding to space changes in the absolute or static value of the earth's total magnetic field and producing simultaneously therewith a continuous photographic record of the terrain beneath the plumb line of the aircraft, edge-marking the record chart upon which the record trace appears at selected intervals along the traverse and simultaneously therewith superimposing a serial number on the photographic record, and at selected intervals along the traverse stamping on the record trace a serial number corresponding to the serial number appearing on the photographic record and a plurality of numbers indicative of the sensitivity of the magnetometer apparatus and the magnetic value of the base line of the record chart.

2. A method of geophysical surveying which comprises the steps of flying an aircraft and magnetometer apparatus associated therewith along a predetermined traverse, measuring the total magnetic field with said magnetometer, producing a continuous record trace corresponding to space changes in the total value of the earth's total magnetic field detected by the magnetometer apparatus as the aircraft moves along the traverse, producing a continuous photographic record of the terrain beneath the plumb line of the aircraft, superimposing on the photographic record at each of selected intervals along the traverse an image of a serial number appearing on a register counter, at each of selected intervals along the traverse stamping on the record chart upon which said trace appears a serial number appearing on a second register counter and corresponding to that appearing on the photographic record and a plurality of numbers corresponding to apparatus dial settings indicative of the sensitivity of the magnetometer apparatus and the magnetic value of the base line of the record chart, and simultaneously edge-marking the record chart and advancing the numbers appearing on said register counters as each serial number is superimposed on the photographic record.

3. A method of geophysical surveying which comprises the steps of flying an aircraft and magnetometer apparatus associated therewith along a predetermined traverse, measuring the total magnetic field with said magnetometer, producing continuous photographic and trace records of the terrain beneath the plumb line of the aircraft and of variations in the total value of the earth's magnetic field detected by the magnetometer apparatus respectively as the aircraft moves along the traverse, correlating the photographic and trace records at selected intervals along the traverse by simultaneously edge-marking the record chart upon which the record trace appears and superimposing on the photographic record the image of a serial number, and at selected intervals along the traverse stamping on the record chart a serial number which verifies the correlation of the edge-marks and the serial numbers corresponding thereto and a plurality of numbers indicative of the sensitivity of the magnetometer apparatus and the magnetic value of the base line of the record chart.

4. In apparatus of the character disclosed for conducting geophysical surveys from an aircraft in flight, the combination of magnetometer apparatus including a recorder for producing a continuous record trace corresponding to space changes in the total value of the earth's magnetic field as the aircraft moves along a predetermined traverse and also including a control box having dials for indicating and adjusting the sensitivity of said magnetometer apparatus and the magnetic value of the base line of the recording chart upon which the record trace appears, a plurality of of number wheels operatively connected to said dials respectively and adapted to indicate numbers corresponding to the settings of the dials, an electric register counter, means including said number wheels and said register counter for causing the numbers indicated thereon to be stamped at will on said recording chart, an electrical device for edge-marking the recording chart, a second electric register counter, a camera adapted for continuous vertical photography of the terrain beneath the plumb line of the aircraft and having means operable at will for superimposing on the recorded image of the terrain an image of the serial number appearing on said second register counter, and means for simultaneously actuating said edge-marking device and advancing the numbers on said register counters as each serial number image is superimposed on the recorded image of the terrain.

5. In apparatus of the character disclosed for conducting geophysical surveys from an aircraft in flight, the combination of a total field magnetometer apparatus including a self-oriented detector and a recorder for producing a record trace corresponding to space changes in the absolute or static value of the earth's total magnetic field detected by said detector as the aircraft moves along a predetermined traverse, a pair of electric register counters, an electrical device for edge-marking the recording chart of the recorder, means for stamping at will on the recording chart the serial number appearing on one of said register counters and a plurality of numbers indicative of the sensitivity of the magnetometer apparatus and the magnetic value of a base line on the recording chart, a camera adapted for continuous vertical photography of the terrain beneath the plumb line of the aircraft and having means including a shutter operable at will for superimposing on the recorded image of the terrain an image of the serial number appearing on the other of said register counters, means for stabilizing the image of the terrain on the camera film, and means for simultaneously actuating said edge-marking device and advancing the numbers on said register counters each time said shutter is actuated.

6. In apparatus of the character disclosed for conducting geophysical surveys from an aircraft in flight, the combination of a total field magnetometer apparatus including a self-oriented detector and a recorder for producing a record trace corresponding to space changes in the absolute or static value of the earth's total magnetic field detected by said detector as the aircraft moves along a predetermined traverse, an electrical device for edge-marking the recording chart of the recorder, means for stamping at will on the recording chart data relating to the sensitivity of the magnetometer apparatus and the magnetic value of a base line on the recording chart, an electric register counter, a camera adapted for continuous and substantially undistorted vertical photography of the terrain beneath the plumb line of the aircraft and having means including a shutter adapted for photography of the serial number appearing on said register counter, a solenoid for actuating said shutter, and a control circuit operable at will for simultaneously actuating said solenoid, register counter, and edge-marking device.

HOMER JENSEN.

REFERENCES CITED

The following references are of record in the file of this patent:

UNITED STATES PATENTS

| Number | Name | Date |
|---|---|---|
| 1,331,978 | Brock et al. | Feb. 24, 1920 |
| 1,585,484 | Gasser | May 18, 1926 |
| 1,658,537 | Reinhold | Feb. 7, 1928 |
| 1,912,485 | Kothny | June 6, 1933 |
| 2,167,630 | Bazzoni et al. | Aug. 1, 1939 |
| 2,307,646 | Sonne | Jan. 3, 1943 |
| 2,338,991 | Arnold | Jan. 11, 1944 |
| 2,406,870 | Vacquier | Sept. 3, 1946 |
| 2,424,772 | Rieber | July 29, 1947 |
| 2,428,034 | Nichols et al. | Sept. 30, 1947 |
| 2,468,554 | Hull | Apr. 26, 1949 |
| 2,518,513 | Wyckoff | Aug. 15, 1950 |
| 2,555,209 | Vacquier | May 29, 1951 |

FOREIGN PATENTS

| Number | Country | Date |
|---|---|---|
| 319,867 | England | Oct. 3, 1929 |

OTHER REFERENCES

Heiland, "A. I. M. E. Transactions," 1932, pp. 213–214.

Heiland, "Engineering and Mining Journal," Dec. 1935, pp. 609–610.

Logachev, "Geophysics," April 1946, pp. 135–147.

"The Airborne Magnetometer," Geophysics, July 1946, pp. 321–334.